United States Patent
Hendry

(10) Patent No.: US 12,015,796 B2
(45) Date of Patent: Jun. 18, 2024

(54) IMAGE CODING METHOD ON BASIS OF ENTRY POINT-RELATED INFORMATION IN VIDEO OR IMAGE CODING SYSTEM

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 93 days.

(21) Appl. No.: 17/769,903

(22) PCT Filed: Sep. 25, 2020

(86) PCT No.: PCT/KR2020/013096
§ 371 (c)(1),
(2) Date: Apr. 18, 2022

(87) PCT Pub. No.: WO2021/096057
PCT Pub. Date: May 20, 2021

(65) Prior Publication Data
US 2022/0400280 A1    Dec. 15, 2022

Related U.S. Application Data

(60) Provisional application No. 62/935,623, filed on Nov. 14, 2019.

(51) Int. Cl.
| | |
|---|---|
| *H04N 19/119* | (2014.01) |
| *H04N 19/13* | (2014.01) |
| *H04N 19/136* | (2014.01) |
| *H04N 19/172* | (2014.01) |
| *H04N 19/174* | (2014.01) |
| *H04N 19/30* | (2014.01) |
| *H04N 19/463* | (2014.01) |

(52) U.S. Cl.
CPC ......... *H04N 19/463* (2014.11); *H04N 19/119* (2014.11); *H04N 19/13* (2014.11); *H04N 19/136* (2014.11); *H04N 19/172* (2014.11); *H04N 19/174* (2014.11); *H04N 19/30* (2014.11)

(58) Field of Classification Search
None
See application file for complete search history.

(56) References Cited

U.S. PATENT DOCUMENTS

2014/0376643 A1*  12/2014  Hendrry ............... H04N 19/91
                                                    375/240.26

FOREIGN PATENT DOCUMENTS

| KR | 20140110876 | 9/2014 |
| KR | 20140145114 | 12/2014 |
| KR | 20150036169 | 4/2015 |

OTHER PUBLICATIONS

Bross et al., ("Versatile Video Coding (Draft 7)," JVET-P2001-vD: Geneva, CH, Oct. 1-11, 2019,) (Year: 2019).*

(Continued)

*Primary Examiner* — Samuel D Fereja
(74) *Attorney, Agent, or Firm* — Fish & Richardson P.C.

(57) ABSTRACT

According to the disclosures of the present document, entry point-related information/parameter can be signaled by means of upper-level syntax, thereby allowing the amount of data necessary to be signaled for video/image coding to be reduced and coding efficiency to be increased.

5 Claims, 13 Drawing Sheets

(56) References Cited

OTHER PUBLICATIONS

Bross et al., "Versatile Video Coding (Draft 7)," JVET-P2001-vD, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 492 pages.

Ikai et al., "AHG12: Clean up on wavefront parallel processing signaling," JVET-O0215, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.

\* cited by examiner

IMAGE CODING METHOD ON BASIS OF ENTRY POINT-RELATED INFORMATION IN VIDEO OR IMAGE CODING SYSTEM

CROSS-REFERENCE TO RELATED APPLICATIONS

This application is a National Stage application under 35 U.S.C. § 371 of International Application No. PCT/KR2020/013096, filed on Sep. 25, 2020, which claims the benefit of U.S. Provisional Application No. 62/935,623, filed on Nov. 14, 2019. The disclosures of the prior applications are hereby incorporated by reference herein in their entirety.

BACKGROUND OF THE DISCLOSURE

Field of the Disclosure

The present disclosure relates to video/image coding technology and, more particularly, to an image coding method based on entry point related information in a video or image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

According to an embodiment of the present document, a method and an apparatus which increase image coding efficiency are provided.

According to an embodiment of the present document, a method and an apparatus which efficiently perform coding through WPP and/or tile technology are provided.

According to an embodiment of the present document, a method and an apparatus for signaling entry point related information are provided.

According to an embodiment of the present document, a method and an apparatus for signaling entry point related information at a sequence parameter set level.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

Advantageous Effects

According to the present disclosure, it is possible to increase overall image/video compression efficiency.

According to the present disclosure, it is possible to efficiently perform coding through WPP or tile technology.

According to the present disclosure, it is possible to efficiently signal entry point related information.

According to the present disclosure, it is possible to signal entry point related information at a sequence parameter set level.

DESCRIPTION OF EXEMPLARY EMBODIMENTS

Figure 1:
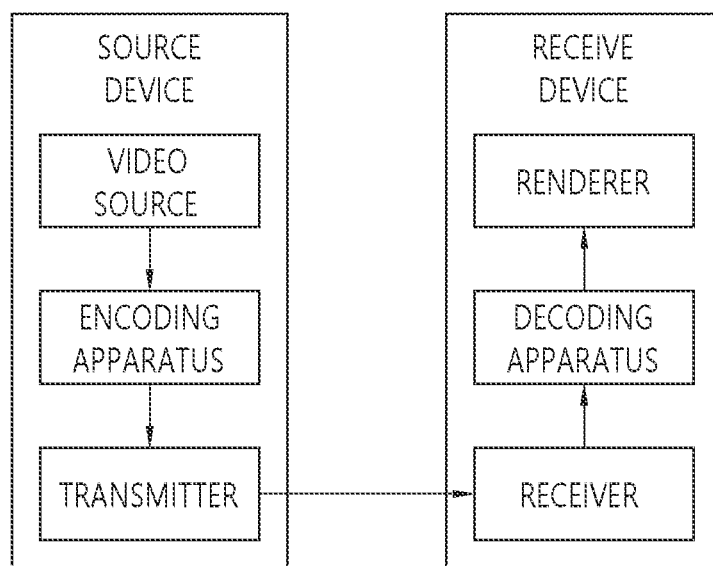
FIG. 1 schematically represents an example of a video/image coding system to which embodiments of the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of this document, embodiments in which configurations are combined and/or separated are included in the scope of claims.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice includes an integer number of complete tiles or an integer number of consecutive complete CTU rows within a tile of a picture that may be exclusively contained in a single NAL unit Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (ie, intra prediction)" is indicated, "intra prediction" may be proposed as an example of "prediction".

Technical features that are individually described in one drawing in this document may be implemented individually or may be implemented at the same time.

Figure 2:
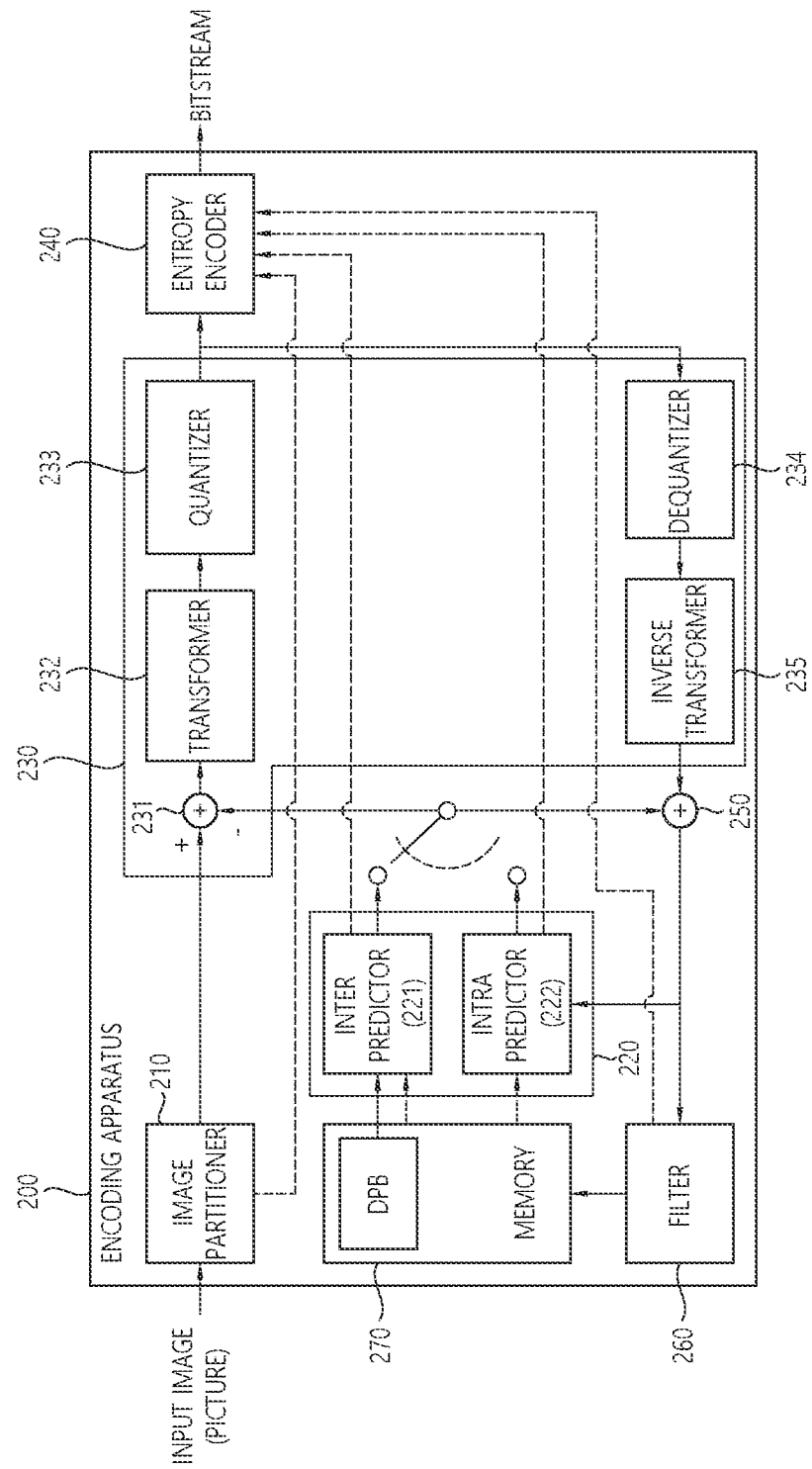
FIG. 2 is a diagram schematically describing a configuration of a video/image encoding apparatus to which embodiments of the present disclosure may be applied.

FIG. 2 is a diagram schematically illustrating a configuration of a video/image encoding apparatus to which the embodiments of the present disclosure may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
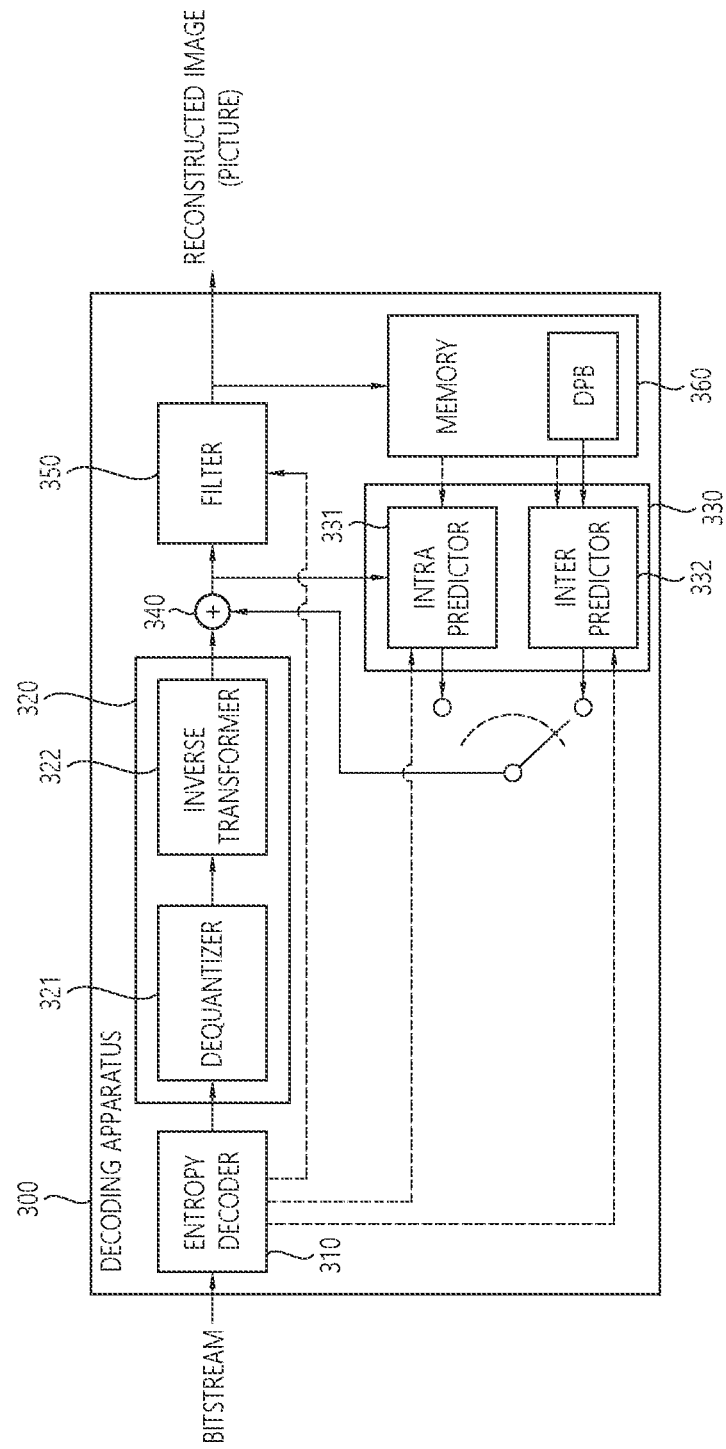
FIG. 3 is a diagram schematically describing a configuration of a video/image decoding apparatus to which embodiments of the present disclosure may be applied.

FIG. 3 is a diagram for schematically explaining a configuration of a video/image decoding apparatus to which the embodiments of the present disclosure may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present document, at least one of the quantization/the dequantization and/or the transform/the inverse transform may be omitted. If the quantization/dequantization are omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present document, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present document.

Figure 4:
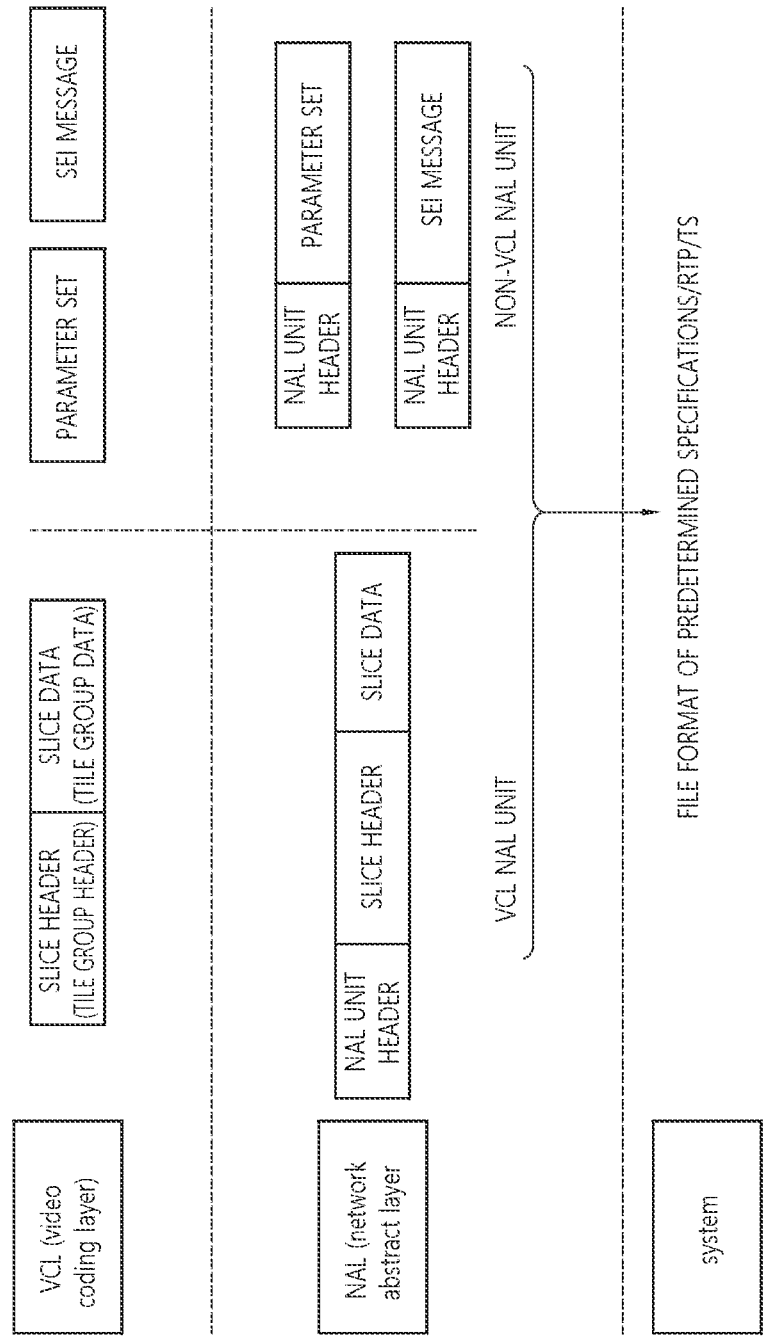
FIG. 4 exemplarily shows a hierarchical structure for a coded image/video.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in FIG. 4, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. For example, one picture may be composed of different types of slices including intra coded slices (namely, I-slices) and/or inter coded slices (namely, P-slices and B-slices). In this case, a picture header may include information/parameters applied to intra coded slices and inter coded slices. Alternatively, one picture may be composed of one type of slice.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, the encoding and decoding apparatus may encode/decode a picture by partitioning the picture into predetermined units. For example, the encoding and decoding apparatus may encode/decode the picture by partitioning the picture into slices and/or tiles.

As described above, one picture may be partitioned into one or more tile rows and/or one or more tile columns. A tile is a rectangular area comprising CTUs within a specific tile row and a specific tile column. CTUs included in one tile may be arranged based on specific scan order. For example, CTUs included in one tile may be arranged consecutively based on the raster scan order. A slice may consist of an integer number of complete tiles or an integer number of consecutive CTU rows contained within a tile of a picture.

In this case, a vertical boundary of each slice within a picture may be a vertical boundary of a tile. A horizontal boundary of each slice within a picture may be a horizontal boundary of a tile or a horizontal boundary of a CTU within the tile. When the horizontal boundary of each slice within a picture is not the horizontal boundary of a tile but the horizontal boundary of a CTU within the tile, the tile within the picture may be partitioned into a plurality of rectangular slices, and each of the plurality of rectangular slices may be composed of an integer number consecutive CTU rows.

Slices may be present in the raster scan slice mode and rectangular slice mode. In the raster scan slice mode, one slice may include one or more tiles arranged in the raster scan order within a picture. For rectangular slice mode, one slice may include an integer number of complete tiles forming a rectangular area within a picture or include an integer number of consecutive CTU rows within one tile forming a rectangular area within a picture. Tiles within a rectangular slice may be scanned based on the raster scan order within the area of the rectangular slice.

Figure 5:
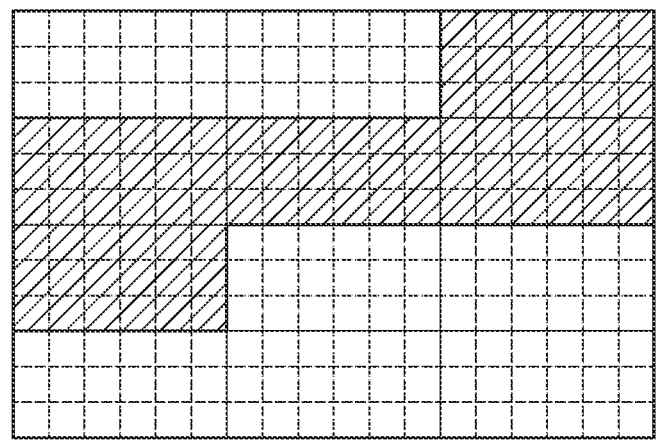
FIGS. 5 to 7 illustrate one embodiment in which a picture is partitioned into slices and tiles.

FIG. 5 shows one embodiment in which a picture is partitioned into slices and tiles.

Here, a thick line represents the boundary of a slice, a thin line represents the boundary of a tile, and a dotted line represents the boundary of a CTU. Referring to FIG. 5, a picture consists of 216 (18×12) CTUs, three tile columns, and four tile rows. Accordingly, the picture comprises 12 tiles and 3 slices based on the raster scan slice mode. Here, among the three slices, slice 1 based on the raster scan order is composed of two complete tiles based on the raster scan order, slice 2 is composed of 5 complete tiles based on the raster scan order, slice 3 is composed of 5 complete tiles based on the raster scan order. The vertical boundary of each of the three slices is composed of vertical boundaries of tiles within the picture. The horizontal boundary of each of the three slices is composed of the horizontal boundaries of tiles (within-tile CTUs) within the picture.

Figure 6:
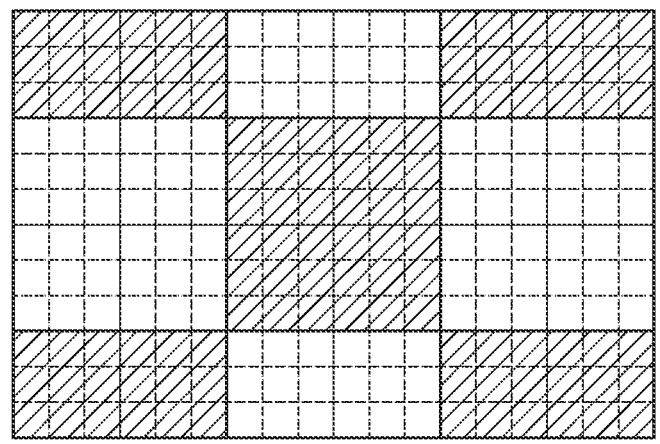

FIG. 6 shows one embodiment in which a picture is partitioned into slices and tiles.

In the same manner, a thick line represents the boundary of a slice, a thin line represents the boundary of a tile, and a dotted line represents the boundary of a CTU. Referring to FIG. 6, a picture consists of 216 (18×12) CTUs, six tile columns, and four tile rows. Accordingly, the picture comprises 24 tiles and 9 slices based on the rectangular slice mode. Here, among the 9 slices, each of slice 1, 2, 3, 7, 8, and 9 based on the raster scan order is composed of two complete tiles, and each of slice 4, 5, and 6 based on the raster scan order is composed of 4 complete tiles. The vertical boundary of each of the 9 slices is composed of vertical boundaries of tiles within the picture. The horizontal boundary of each of the 9 slices is composed of the horizontal boundaries of tiles (within-tile CTUs) within the picture.

Figure 7:
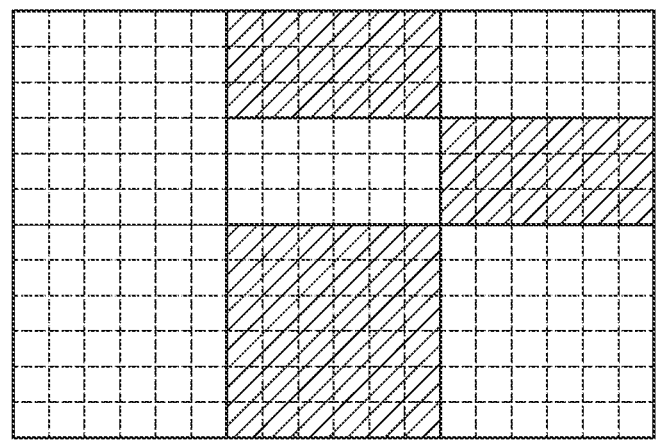

FIG. 7 shows one embodiment in which a picture is partitioned into slices and tiles.

In the same manner, a thick line represents the boundary of a slice, a thin line represents the boundary of a tile, and a dotted line represents the boundary of a CTU. Referring to FIG. 7, a picture consists of 216 (18×12) CTUs, three tile columns, and two tile rows. Accordingly, the picture comprises 6 tiles and 7 slices based on the rectangular slice mode. Here, among the 7 slices, slice 1 based on the raster scan order is composed of two complete tiles, each of slice 2, 3, 4, and 5 based on the raster scan order is composed of 3 consecutive CTU rows included within a tile, and slice 6 and 7 based on the raster scan order comprises one complete tile. The vertical boundary of each of the 7 slices is composed of vertical boundaries of tiles within the picture. The horizontal boundary of each of slice 1, 6, and 7 among the 7 slices is composed of the horizontal boundaries of tiles (within-tile CTUs) within the picture. The upper horizontal boundary of each of slice 2 and 3 among the 7 slices is composed of horizontal boundaries of tiles (within-tile CTUs) within the picture, and the lower horizontal boundary is composed of horizontal boundaries of CTUs within tiles, which do not constitute the horizontal boundary of a tile. The upper horizontal boundary of each of slice 4 and 5 among the 7 slices is composed of horizontal boundaries of CTUs within tiles, which do not constitute the horizontal boundary of a tile, and the lower horizontal boundary is composed of horizontal boundaries of tiles (within-tile CTUs) within the picture.

As described above, the video encoding apparatus and the video decoding apparatus may process (encode/decode) a picture by partitioning the picture in slice, tile, and/or CTU row units. At this time, since the video encoding apparatus/video decoding apparatus requires a relatively higher amount of computation in the process of compressing and decompressing data than other multimedia technologies, when the encoding apparatus/decoding apparatus is equipped with a multi-core processor or a multi-processor, the encoding apparatus/decoding apparatus may perform encoding/decoding independently and in parallel for partition areas of different units.

On the other hand, when the encoding/decoding apparatus has a single-core processor, the encoding/decoding apparatus may not perform parallel processing and thus reduce/adjust the memory load for single processing.

When the encoding apparatus/decoding apparatus has a multi-core processor or a multi-processor, the encoding apparatus/decoding apparatus may use parallelization techniques to increase coding efficiency. For example, the parallelization techniques may include Wavefront Parallel Processing (WPP), Tiles, and the like.

WPP may support slices in a picture to be processed (encoded/decoded) in parallel. In other words, WPP may support parallel processing (encoding/decoding) of CTU rows in a picture by partitioning the picture into CTU rows. In addition, WPP enables parallel processing of entropy coding for a plurality of sub-bitstreams within slice data by generating a sub-bitstream in CTU row units for entropy coding and transferring the start position of the sub-bitstream in the slice header. In this respect, to perform parallel processing of entropy coding in units of CTU rows, CABAC should be applied independently for each CTU row, and the CABAC should synchronize a context model continuously while the CTU is coded within a slice. To minimize degradation of CABAC coding efficiency, when a CTU at the upper right side of the first CTU of each CTU row is synchronized after being encoded/decoded, WPP may initialize the context model through the synchronized CABAC context before coding each CTU row.

Through the above operation, it is possible to minimize degradation of coding efficiency compared to the case of independently initializing the CABAC context in units of CTU rows. In other words, unlike tiles and slices, since WPP performs intra prediction or inter prediction by utilizing information on the blocks already coded in the upper CTU row, parallel processing (encoding/decoding) of video/images is made possible while degradation of coding efficiency is minimized.

Figure 8:
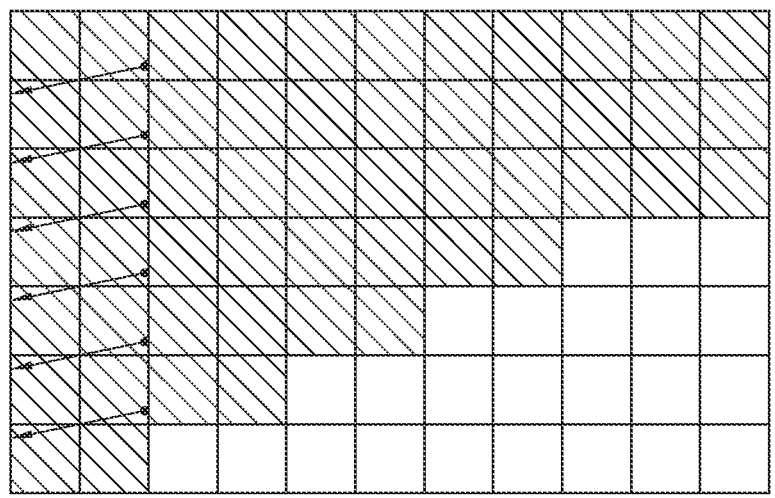
FIG. 8 exemplarily shows initialization of a CABAC context model for WPP.

FIG. 8 exemplarily shows initialization of a CABAC context model for WPP.

For example, referring to FIG. 8, entropy encoding/decoding of a picture may be processed for each sub-bitstream related to each CTU row. For example, when entropy encoding/decoding for a sub-bitstream corresponding to the n (where n is an integer)-th CTU row is processed, entropy encoding/decoding for the sub-bitstream corresponding to the (n+1)-th CTU row may be processed.

Specifically, when entropy encoding/decoding for the second CTU of the sub-bitstream corresponding to the n-th CTU row is completed, related CABAC context may be stored. Afterward, the first CTU of a sub-bitstream corresponding to the (n+1)-th CTU row may be entropy encoded/decoded based on the CABAC context for the second CTU of the n-th sub-bitstream.

Meanwhile, the tile technology may support parallel processing (encoding/decoding) of tiles in a picture by partitioning the picture into tiles. In addition, the tile technology enables parallel processing of entropy coding for a plurality of sub-bitstreams within slice data by generating a sub-bitstream in tile units for entropy coding and transferring the start position of the sub-bitstream in the slice header. When a picture is partitioned into the same number of slices or tiles, the number of CTUs positioned on the partition boundary is smaller when it is partitioned into tiles compared to the case when it is partitioned into slices. Also, since a tile transmits only the partition information of the tile through a PPS, it may be effective in terms of coding efficiency compared to slice partitioning, which uses a slice header additionally for each partition area.

To enable the parallel processing above, entry point related information may be signaled. Signaling the entry point related information may support a decoding apparatus to directly access a start point of data segments of a coded slice within a NAL unit. Here, the start point of the data segments may be the start point of tiles included in the slice or the start point of CTU rows included in the slice.

In other words, the entry point may mean an access point on a bitstream for performing encoding/decoding in parallel using WPP or tile technology. Also, the entry point may be a start point of each sub-bitstream for encoding/decoding to be started. For example, the entry point may be a start point of each WPP sub-bitstream or each tile that is a target point of parallel processing on the bitstream. When the encoding apparatus/decoding apparatus has a multi-core processor or a multi-processor, the encoding apparatus/decoding apparatus may perform encoding/decoding independently and in parallel at different entry points. Although WPP and tile technology are different in the encoding/decoding technology intended to be applied, information related to the entry point of a CTU row (sub-bitstream corresponding to the CTU row) to which WPP is applied and information related to the entry point of a tile may be signaled in the same manner.

In other words, it is important to signal each CTU row to which WPP is applied for parallel processing or information related to the entropy point of a sub-bitstream corresponding to each CTU row and to signal each tile or information related to the entropy point of a sub-bitstream corresponding to each tile. Here, the information related to the entry point may be referred to as entry point related information.

However, even when WPP is available or slices in a picture include a plurality of tiles, entry point related information may not be signaled. For example, even if slices in a picture include a plurality of tiles, entry point related information may not be required unless the tiles are configured for parallel processing. For example, a tile may be used to lay out more complex coding blocks within a slice or a picture.

However, it is inefficient for the encoder/decoder to perform parallel processing when entry point related information is not signaled even though WPP is available. For example, since the encoder/decoder needs to parse slice data (payload) to find the start point of each CTU row, a problem of inefficiency occurs.

Meanwhile, there is a constraint that the value of a no-picture partition flag related to whether no-picture partitioning is applied to the current picture has to be the same for all PPSs within a coded video sequence (CVS) or coded layer video sequence (CLVS). The constraint implies that, for the tile technology to be applied, the tile technology has to be applied to all pictures within a CVS or a CLVS.

Similarly, if WPP is applied, WPP has to be applied for all pictures within a CVS or a CLVS. However, even for pictures currently present within one CVS or CLVS, entry point related information may be present in the slice headers of some pictures, but entry point related information may not be present in the slice headers of some other pictures.

In this case, embodiments of the present disclosure may include one or more of the following features.

i) When WPP is available, entry point related information may be present.

ii) When WPP is available and a slice includes one or more CTU rows, entry point related information may be included in the slice header.

iii) A value of an entry point present flag indicating whether an entry point is present may be constrained to have the same value for pictures within one CVS or CLVS.

iv) An SPS may parse/signal the following syntax elements:

A flag related to whether picture partitioning is applied to pictures in a coded layer video sequence (CLVS)

A flag related to the availability of WPP for pictures within a CLVS

A flag related to the presence of an entry point for each slice header of pictures within a CLVS Here, the entry point related information may include various pieces of information based on an embodiment of the present disclosure. For example, the entry point related information may include at least one of no_pic_partition_flag, entropy_coding_sync_enabled_flag, entry_point_offsets_present_flag, offset_len_minus1, entry_point_offset_minus1, and/or num_entry_point_offsets.

Based on an embodiment of the present disclosure, entry point related information may be signaled as follows.

For example, the entry point related information may include offset length information and entry point offset information. For example, the offset length information may be related to the number of bits of the entry point offset information. In other words, the offset length information may indicate/represent the number of bits of the entry point offset information.

For example, the offset length information may be expressed in the form of the offset_len_minus1 syntax element. For example, the value+1 of the offset_len_minus1 syntax element may specify the number of bits of the entry point offset information (e.g., entry_point_offset_minus1 syntax element).

Also, the entry point offset information may represent the offset between two entry points. For example, in this case, the entry point offset information may express the offset between the two entry points in byte units. For example, the entry point offset information may be expressed in the form of the entry_point_offset_minus1 syntax element. For example, the value+1 of the entry_point_offset_minus1 syntax element may indicate to specify the offset in byte units.

At least one entry point present within the current picture may be derived based on the offset length information and the entry point offset information.

Also, the entry point related information may include the entry point offset present flag. For example, the entry point offset present flag may be related to whether entry point offsets are signaled. In other words, the entry point offset present flag may indicate/represent whether to signal entry point offsets. For example, the entry point offset present flag may be expressed in the form of entry_point_offsets_present_flag syntax element.

When the value of the entry point offset present flag is 1, the number of entry points within a current slice may be derived. When the number of entry points derived is greater than 0, the offset length information and the entry point offset information may be configured/included in the slice header for the current slice.

For example, a slice header may include the syntax of Table 1 below. The syntax of Table 1 below may form a part of the slice header.

TABLE 1

|  | Descriptor |
|---|---|
| slice_header( ) {<br>  ...<br>  if( entry_point_offsets_present_flag &&<br>      NumEntryPoints > 0 ) {<br>    offset_len_minus1<br>    for( i = 0; i < NumEntryPoints; i++ )<br>      entry_point_offset_minus1[ i ]<br>  }<br>  ...<br>} | <br><br><br><br>ue(v)<br><br>u(v) |

Referring to Table 1, when the value of entry_point_offsets_present_flag related to the entry point offset present flag is 1, NumEntryPoints related to the number of entry points present in the current slice may be derived as shown in Table 2.

TABLE 2

```
NumEntryPoints = 0
for( i = 1; i < NumCtuInCurrSlice; i++ ) {
    CtbAddrInRs = CtbAddrInCurrSlice[ 1 ]
    CtbAddrX = ( CtbAddrInRs % PicWidthInCtbsY )
    CtbAddrY = ( CtbAddrInRs / PicWidthInCtbsY )
    if( CtbAddrX = = CtbToTileColBd[ CtbAddrX ] &&
        ( CtbAddrY = = CtbToTileRowBd[ CtbAddrY ] | | entropy_coding_sync_enabled_flag ) )
        NumEntryPoints;+
}
```

Here, semantics of the syntax elements included in the syntax of Table 1 may be expressed as shown in Table 3.

TABLE 3 offset_len_minus1 plus 1 specifies the length, in bits, of the entry_point_offset_minus1[ i ] syntax elements. The value of offset_len_minus1 shall be in the range of 0 to 31, inclusive.
entry_point_offset_minus1[ i ] plus 1 specifies the i-th entry point offset in bytes, and is represented by offset_len_minus1 plus 1 bits. The slice data that follow the slice header consists of NumEntryPoints + 1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[ 0 ], inclusive, of the coded slice data, subset k, with k in the range of 1 to NumEntryPoints − 1, inclusive, consists of bytes firstByte[ k ] to lastByte[ k ], inclusive,, of the coded slice data with firstByte[ k ] and lastByte[ k ] defined as:
    firstByte[ k ] = $\Sigma_{n=1}^{k}$( entry_point_offset_minus1[ n − 1 ] + 1 )
    lastByte[ k ] = firstByte[ k ] + entry_point_offset_minus1[ k ]
The last subset (with subset index equal to NumEntryPoints) consists of the remaining bytes of the coded slice data.
When entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints + 1) shall be equal to the number of tiles in the slice.
When entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice.
When entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints + 1) s hall be equal to the total number of tile-specific CTU rows in the slice.

According to one embodiment of the present disclosure, the entry point related information may include a no-picture partition flag. The no-picture partition flag may be related to whether no-picture partitioning is applied to a current picture. In other words, the no-picture partition flag may indicate/represent whether no-picture partitioning is applied to the current picture.

At this time, the no-picture partition flag may be signaled by being included in a PPS. For example, when a CVS or a CLVS is started, a PPS is checked, and the no-picture partition flag present within the PPS may be checked. For example, in this case, the no-picture partition flag may be expressed in the form of no_pic_partition_flag syntax element.

Also, the entry point related information may include an entropy coding synchronization enabled flag. When k (where k is an integer) CTU rows are included in a slice, the entropy coding synchronization enabled flag may be related to whether coding for the first CTU of the (m+1)-th row is performed based on the synchronized context of the second CTU of the m-th row when coding for the second CTU of the m-th row (where m is an integer less than k) is completed. In other words, when k (where k is an integer) CTU rows are included in a slice, the entropy coding synchronization enabled flag may indicate/represent whether coding for the first CTU of the (m+1)-th row is performed based on the synchronization context of the second CTU of the m-th row when coding for the second CTU of the m-th row (where m is an integer less than k) is completed. In other words, the entropy coding synchronization enabled flag may indicate/represent whether the WPP is performed.

At this time, the entropy coding synchronization enabled flag may be signaled by being included in a PPS. For example, when a CVS or a CLVS is started, a PPS is checked, and the entropy coding synchronization enabled flag present within the PPS may be checked. For example, in this case, the entropy coding synchronization enabled flag may be expressed in the form of entropy_coding_sync_enabled_flag syntax element.

For example, a PPS may include the syntax of Table 4 below. The syntax of Table 4 below may form a part of the PPS.

TABLE 4

|  | Descriptor |
| --- | --- |
| pic_parameter_set_rbsp( ) { |  |
|   ... |  |
|   no_pic_partition_flag | u(1) |
|   if( !no_pic_partition_flag ) { |  |
|     ... |  |
|   } |  |
|   entropy_coding_sync_enabled_flag | u(1) |
|   if( !no_pic_partition_flag) |  |
|     entry_point_offsets_present_flag | u(1) |
|   ... | u(1) |
| } |  |

Here, semantics of the syntax elements included in the syntax of Table 4 may be expressed as shown in Table 5.

TABLE 5 entry_point_offsets_present_flag equal to 1 specifies that entry point offsets signalling may be present in the slice headers of pictures referring to the PPS. entry_point_offsets_present_flag equal to 0 specifies that entry point offsets signalling are not present in the slice headers of pictures referring to the PPS.
When not present, the following applies:
 - If entropy_coding_sync_enabled_flag is equal to 1, the value of entry_point_offset_present_flag is inferred to be equal to 1
 - Otherwise, (if no_partition_flag is equal to 1), the value of entry_point_offset_present_flag is inferred to be equal to 0

In other words, entry_point_offsets_present_flag syntax element may indicate whether entry point offset information is present based on whether the value of the entry_point_offsets_present_flag syntax element is 0 or 1. The entry_point_offsets_present_flag syntax element may be called the entry point offset present flag and may be included in a PPS. In other words, the entry point offset present flag may be signaled in the PPS (or at the PPS level). When the value of the entry point offset present flag signaled in the PPS is 1, entry point offset information may be present for the pictures within a CVS or a CLVS referencing the PPS.

Based on the one embodiment, when the value of the no-picture partition flag is 0, the entry point offset present flag may be signaled by being included in the PPS. At this time, the entry point offset present flag may be signaled without checking the value of the entropy coding synchronization enabled flag. On the other hand, when the value of the no-picture partition flag is 1, the entry point offset present flag may not be present. When the entry point offset present flag is not present, the value of the entry point offset present flag may not be derived immediately as 0 but may be derived as 0 or 1 depending on a specific condition.

For example, when the entry point offset present flag is not present, and the value of the entropy coding synchronization enabled flag is 1, the value of the entry point offset present flag may be derived as 1.

For example, when the entry point offset present flag is not present, and the value of the entropy coding synchronization enabled flag is not 1, the value of the entry point offset present flag may be derived as 0.

Meanwhile, according to one embodiment of the present disclosure, a PPS may include the syntax of Table 6 below. The syntax of Table 6 below may form a part of the PPS.

TABLE 6

|  | Descriptor |
| --- | --- |
| pic_parameter_set_rbsp( ) { | |
| ... | |
|   no_pic_partition_flag | u(1) |
|   if( !no_pic_partition_flag ) { | |
|     ... | |
|   } | |
|   entropy_coding_sync_enabled_flag | u(1) |
|   if( !no_pic_partition_flag \|\| | |
|     entropy_coding_sync_enabled_flag ) | |
|     entry_point_offsets_present_flag | u(1) |
|   ... | u(1) |
| } | |

Here, semantics of the syntax elements included in the syntax of Table 6 may be expressed as shown in Table 7.

TABLE 7 entry_point_offsets_present_flag equal to 1 specifies that entry point offsets signalling may be present in the slice headers of pictures referring to the PPS. entry_point_offsets_present_flag equal to 0 specifies that entry point offsets signalling are not present in the slice headers of pictures referring to the PPS. When not present, the value of entry_point_offsets_present_flag is inferred to be equal to 0.
It is a requirement of bitstream conformance that, when present, the value of entry_point_offsets_present_flag shall be the same for all PPSs that are referred to by coded pictures within a CLVS.

In other words, entry_point_offsets_present_flag syntax element may indicate whether entry point offset information is present based on whether the value of the entry_point_offsets_present_flag syntax element is 0 or 1. The entry_point_offsets_present_flag syntax element may be called the entry point offset present flag and may be included in a PPS. In other words, the entry point offset present flag may be signaled in the PPS (or at the PPS level). When the value of the entry point offset present flag signaled in the PPS is 1, entry point offset information may be present for the pictures within a CVS or a CLVS referencing the PPS.

Based on the one embodiment, when the value of the no-picture partition flag is 0, or the value of the entropy coding synchronization enabled flag is 1, the entry point offset present flag may be signaled by being included in the PPS. On the other hand, when the value of the no-picture partition flag is 1, and the entropy coding synchronization enabled flag is 0, the entry point offset present flag may not be present.

For example, when the value of the entry point offset present flag is not present, the value of the entropy coding synchronization flag may be derived as 0.

Also, based on the one embodiment of the present disclosure, values of the entry point offset present flags for all PPSs referenced by the pictures within a coded layer video sequence (CLVS) may be constrained to be the same.

Based on one embodiment of the present disclosure, the entry point related information may include a first no-picture partition flag. The first no-picture partition flag may be related to whether no-picture partitioning is applied to a current picture. In other words, the first no-picture partition flag may indicate/represent whether no-picture partitioning is applied to the current picture.

At this time, the first no-picture partition flag may be signaled by being included in an SPS. For example, when a CVS or a CLVS is started, an SPS is checked, and the first no-picture partition flag present within the SPS may be checked. For example, in this case, the first no-picture partition flag may be expressed in the form of sps_no_picpartition_flag syntax element.

Also, based on one embodiment of the present disclosure, the entropy coding synchronization enabled flag may be signaled by being included in an SPS. For example, when a CVS or a CLVS is started, an SPS is checked, and the entropy coding synchronization enabled flag present within the SPS may be checked. For example, in this case, the entropy coding synchronization enabled flag may be expressed in the form of sps_entropy_coding_sync_enabled_flag syntax element.

In this case, the entry point offset present flag may be signaled by being included in an SPS. For example, when a CVS or a CLVS is started, an SPS is checked, and the entry point offset present flag present within the SPS may be checked. For example, in this case, the entry point offset present flag may be expressed in the form of entry_point_offsets_present_flag syntax element.

For example, an SPS may include the syntax of Table 8 below. The syntax of Table 8 below may form a part of the SPS.

TABLE 8

|  | Descriptor |
| --- | --- |
| seq_parameter_set_rbsp( ) { | |
| ... | |
| sps_no_pic_partition_flag | u(1) |
| sps_entropy_coding_sync_enabled_flag | u(1) |
| if( !sps_no_pic_partition_flag \|\| | |
| sps_entropy_coding_sync_enabled_flag ) | |
| entry_point_offsets_present_flag | u(1) |
| ... | u(1) |
| } | |

Here, semantics of the syntax elements included in the syntax of Table 8 may be expressed as shown in Table 9.

TABLE 9 sps_no_pic_partition_flag equal to 1 specifies that no picture partitioning applied to each picture referring to the SPS. sps_no_pic_partition_flag equal to 0 specifies each picture referring to the SPS may be partitioned into more than one tile or slice.

sps_entropy_coding_sync_enabled_flag equal to 1 specifies that a specific synchronization process for context variables is invoked before decoding the CTU that includes the first CTB of a row of CTBs in each tile in each picture referring to the SPS. and a specific storage process for context variables is invoked after decoding the CTU that includes the first CTB of a row of CTBs in each tile in each picture referring to the SPS.

sps_entropy_coding_sync_enabled_flag equal to 0 specifies that no specific synchronization process for context variables is required to be invoked before decoding the CTU that includes the first CTB of a row of CTBs in each tile in each picture referring to the SPS. and no specific storage process for context variables is required to be invoked after decoding the CTU that includes the first CTB of a row of CTBs in each tile in each picture referring to the SPS.

In other words, sps_no_pic_partition_flag syntax element may indicate whether no-picture partitioning is applied to a current picture based on whether the value of the sps_no_pic_partition_flag syntax element is 0 or 1. The sps_no_pic_partition_flag syntax element may be called the first no-picture partition flag and may be included in an SPS. In other words, the first no-picture partition flag may be signaled in the SPS (or at the SPS level). When the value of the first no-picture partition flag signaled in the SPS is 1, no-picture partitioning may be applied to the pictures within a CVS or a CLVS referencing the SPS.

Also, sps_entropy_coding_sync_enabled_flag syntax element may indicate whether entropy coding synchronization is possible based on whether the value of the sps_entropy_coding_sync_enabled_flag syntax element is 0 or 1. The sps_entropy_coding_sync_enabled_flag syntax element may be called the entropy coding synchronization enabled flag and may be included in an SPS. In other words, the entropy coding synchronization enabled flag may be signaled in the SPS (or at the SPS level). When the value of the entropy coding synchronization enabled flag signaled in the SPS is 1, entropy coding synchronization is possible for the pictures within a CVS or a CLVS referencing the SPS.

Based on the one embodiment, when the value of the first no-picture partition flag is 0, or the value of the entropy coding synchronization enabled flag is 1, the entry point offset present flag may be signaled by being included in the SPS. On the other hand, when the value of the first no-picture partition flag is 1, and the entropy coding synchronization enabled flag is 0, the entry point offset present flag may not be present.

For example, when the value of the entry point offset present flag is not present, the value of the entropy coding synchronization flag may be derived as 0.

Based on one embodiment of the present disclosure, the first no-picture partition flag may process whether no-picture partitioning is applied to a current picture individually by signaling an additional flag at a lower level than the SPS.

For example, the entry point related information may include a second no-picture partition flag. The second no-picture partition flag may be related to whether no-picture partitioning is applied to a current picture. In other words, the second no-picture partition flag may indicate/represent whether no-picture partitioning is applied to the current picture.

At this time, the second no-picture partition flag may be signaled by being included in a PPS. For example, when a CVS or a CLVS is started, a PPS is checked, and the second no-picture partition flag present within the PPS may be checked. For example, in this case, the second no-picture partition flag may be expressed in the form of pps_no_pic_partition_flag syntax element.

For example, a PPS may include the syntax of Table 10 below. The syntax of Table 10 below may form a part of the PPS.

TABLE 10

| | Descriptor |
|---|---|
| pic_parameter_set_rbsp( ) { | |
| ... | |
| pps_no_pic_partition_flag | u(1) |
| if( !pps_no_pic_partition_flag ) { | |
| ... | |
| } | |
| ... | u(1) |
| } | |

Here, semantics of the syntax elements included in the syntax of Table 10 may be expressed as shown in Table 11.

TABLE 11 pps_no_pic_partition_flag equal to 1 specifies that no picture partitioning applied to each picture referring to the PPS. pps_no_pic_partition_flag equal to 0 specifies each picture referring to the PPS may be partitioned into more than one tile or slice.

In other words, pps_no_pic_partition_flag syntax element may indicate whether no-picture partitioning is applied to a current picture based on whether the value of the pps_no_pic_partition_flag syntax element is 0 or 1. The pps_no_pic_partition_flag syntax element may be called the second no-picture partition flag and may be included in a PPS. In other words, the second no-picture partition flag may be signaled in the PPS (or at the PPS level). When the value of the second no-picture partition flag signaled in the PPS is 1, no-picture partitioning may be applied to the pictures within a CVS or a CLVS referencing the PPS. In this case, values of the no-picture partition flags for all PPSs referenced by the pictures within the CLVS may not be constrained to be the same.

Based on the one embodiment of the present disclosure, two no-picture partition flags may be included hierarchically. In this case, the first no-picture partition flag may be included in the SPS, and the second no-picture partition flag may be included in the PPS. At this time, the value of the second no-picture partition flag included in the PPS may be configured to be the same as the value of the first no-picture partition flag included in the SPS referenced by the PPS. However, the configuration above is only an example, and the no-picture partition flag may be included in only one of the SPS or the PPS. For example, the no-picture partition flag may not be included in the SPS but included only in the PPS. Based on the one embodiment, the entropy coding synchronization enabled flag and the entry point offset present flag may not be included in the PPS.

The drawings in the following have been made to illustrate one specific embodiment of the present disclosure. The names of specific apparatus or specific signals/messages/fields disclosed in the drawings have been chosen for an illustrative purpose only; therefore, technical features of the present disclosure are not limited to the specific names used in the following drawings.

Figure 9:
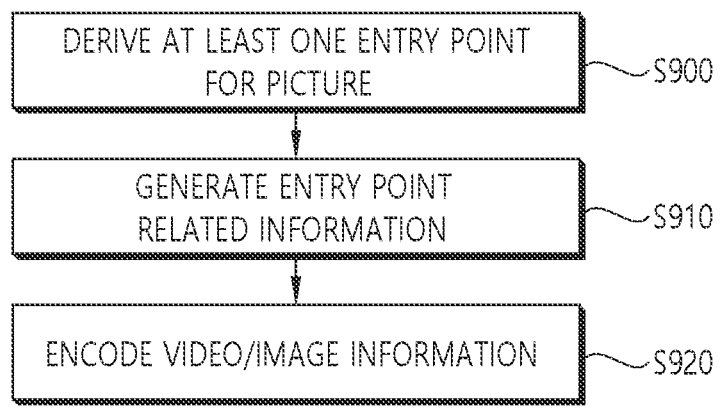
FIGS. 9 and 10 illustrate an example of a video/image encoding method and related components according to an embodiment(s) of the present disclosure.
Figure 10:
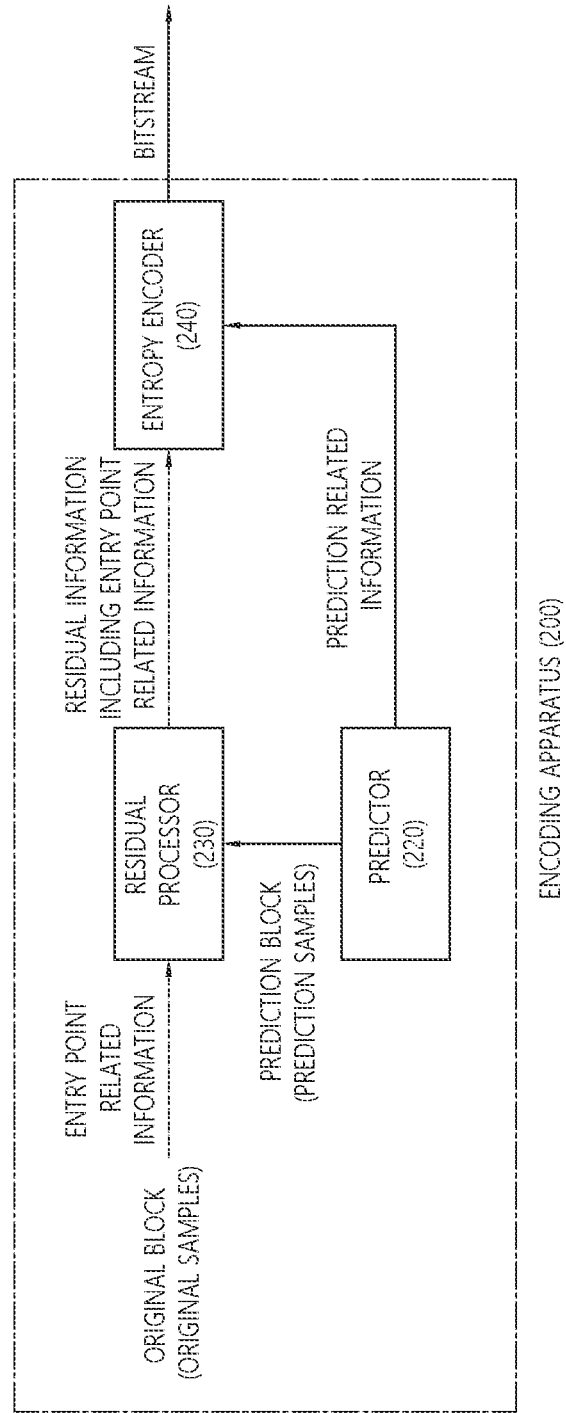

FIGS. 9 and 10 illustrate an example of a video/image encoding method and related components according to an embodiment(s) of the present disclosure. The method disclosed in FIG. 9 may be performed by the encoding apparatus disclosed in FIG. 2. Specifically, for example, S900 and S910 of FIG. 9 may be performed by the image partitioner 210 of the encoding apparatus, and S920 of FIG. 9 may be performed by the entropy encoder 240 of the encoding apparatus. The method disclosed in FIG. 9 may include the embodiments described in the present document.

Referring to FIG. 9, the encoding apparatus derives at least one entry point for a current picture S900. The encoding apparatus may partition an input image (or a picture or a frame) into predetermined units. For example, the encoding apparatus may partition an input image into slices, tiles, or CTU row units. At this time, for example, when WPP is applied to the current picture, the encoding apparatus may derive at least one entry point corresponding to at least one CTU row constituting the current picture. In another example, when tile technology is applied to the current picture, the encoding apparatus may derive at least one entry point corresponding to at least one tile constituting the current picture.

The encoding apparatus generates entry point related information based on the at least one entry point S910. For example, the entry point related information may include at least one from among a no-picture partition flag, an entropy coding synchronization enabled flag, an entry point offset present flag, offset length information, and/or entry point offset information. For example, the entry point related information may include at least one of no_pic_partition_flag, entropy_coding_sync_enabled_flag, entry_point_offsets_present_flag, offset_len_minus1, entry_point_offset_minus1, and/or num_entry_point_offsets syntax elements.

The encoding apparatus encodes image/video information S920. The image/video information may include the entry point related information. Also, the image/video information may include various pieces of information based on the embodiments of the present disclosure. For example, the image/video information may include the information disclosed in at least one of Table 1, 4, 6, 8, and/or 10.

The encoded image/video information may be output in the form of a bitstream. The bitstream may be transferred to a decoding apparatus through a network or a storage medium.

Specifically, the entry point related information may include various pieces of information based on the embodiments of the present disclosure.

For example, the entry point related information may include offset length information and entry point offset information. For example, the offset length information may be related to the number of bits of the entry point offset information. In other words, the offset length information may indicate/represent the number of bits of the entry point offset information.

For example, the offset length information may be expressed in the form of the offset_len_minus1 syntax element. For example, the value+1 of the offset_len_minus1 syntax element may specify the number of bits of the entry point offset information (e.g., entry_point_offset_minus1 syntax element).

Also, the entry point offset information may represent the offset between two entry points. For example, in this case, the entry point offset information may express the offset between the two entry points in byte units. For example, the entry point offset information may be expressed in the form of the entry_point_offset_minus1 syntax element. For example, the value+1 of the entry_point_offset_minus1 syntax element may indicate to specify the offset in byte units.

Also, the entry point related information may include the entry point offset present flag. For example, the entry point offset present flag may be related to whether entry point offsets are signaled. In other words, the entry point offset present flag may indicate/represent whether to signal entry point offsets. For example, the entry point offset present flag may be expressed in the form of entry_point_offsets_present_flag syntax element.

When the value of the entry point offset present flag is 1, the number of entry points within a current slice may be derived. When the number of entry points derived is greater than 0, the offset length information and the entry point offset information may be configured/included in the slice header for the current slice.

The entry point offset present flag may be included in the SPS.

The entry point related information may further include an entropy coding synchronization enabled flag, and the entropy coding synchronization enabled flag may be included in the SPS.

The entry point related information may include a first no-picture partition flag and a second no-picture partition flag. The first no-picture partition flag may be included in the SPS, and the second no-picture partition flag may be included in the PPS.

At this time, the value of the second no-picture partition flag included in the PPS may be configured to be the same as the value of the first no-picture partition flag included in the SPS reference by the PPS.

Meanwhile, based on one embodiment of the present disclosure, the entry point offset present flag may be included in the PPS, and values of the entry point offset present flags for all PPSs referenced by the pictures within a coded layer video sequence (CLVS) may be the same.

Figure 11:
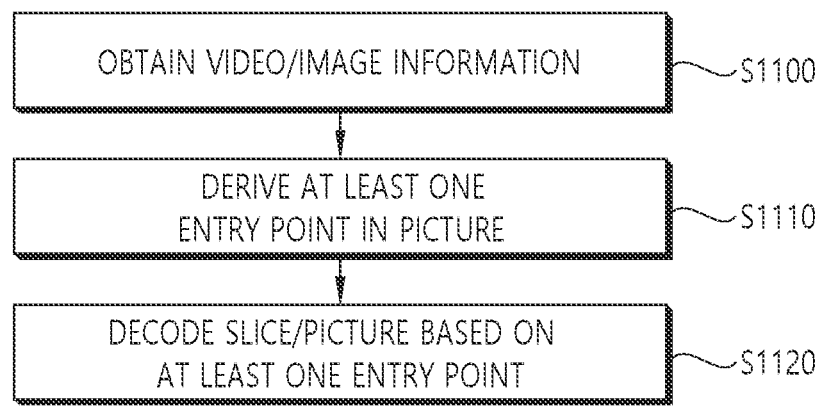
FIGS. 11 and 12 illustrate an example of a video/image decoding method and related components according to an embodiment(s) of the present disclosure.
Figure 12:
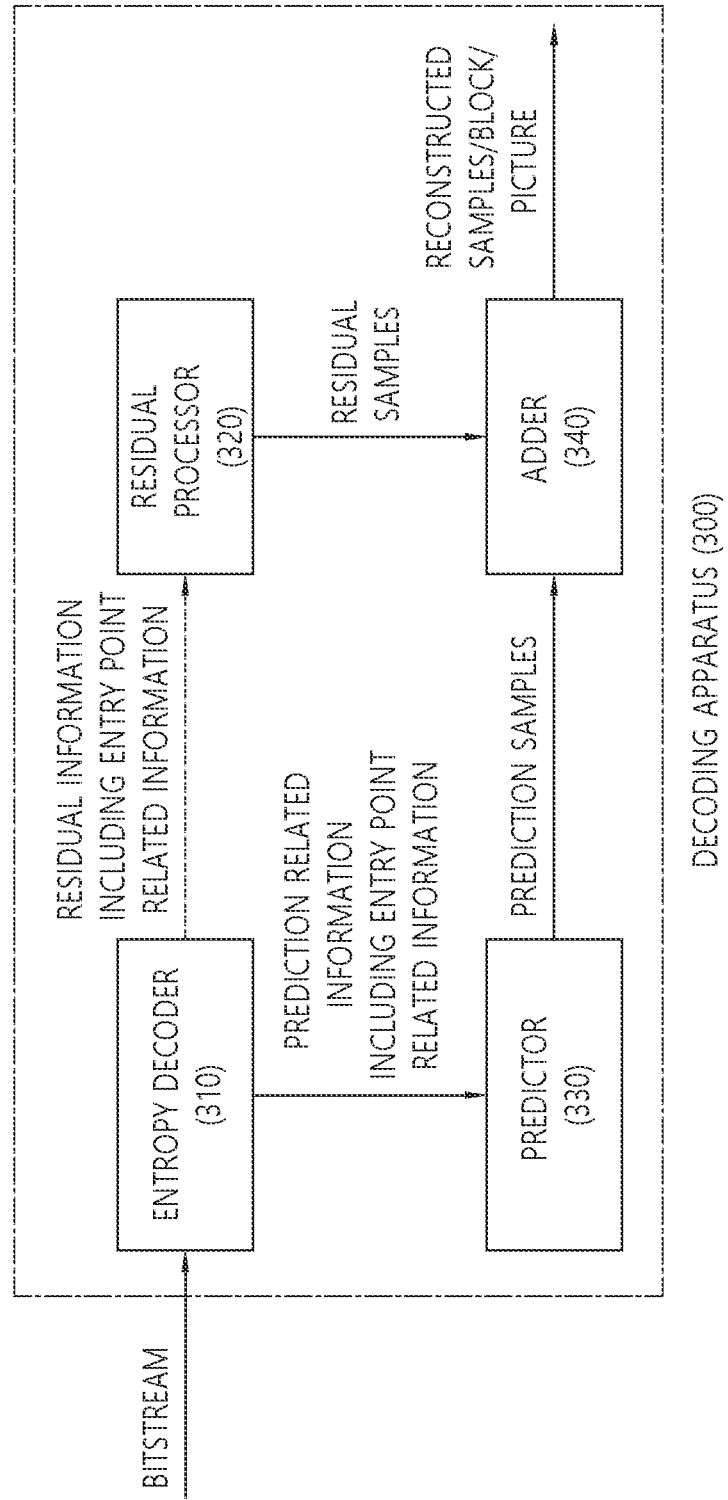

FIGS. 11 and 12 illustrate an example of a video/image decoding method and related components according to an embodiment(s) of the present disclosure. The method disclosed in FIG. 11 may be performed by the decoding apparatus disclosed in FIG. 3. Specifically, for example, S1100 and S1110 of FIG. 11 may be performed by the entropy decoder 310 of the decoding apparatus, and S1120 of FIG. 9 may be performed by at least one of the residual processor 320, the predictor 330, and/or the adder 340 of the decoding apparatus. The method disclosed in FIG. 11 may include the embodiments described in the present document.

Referring to FIG. 11, the decoding apparatus receives/obtains image/video information S1100. The decoding apparatus may receive/obtain the image/video information through a bitstream. The image/video information may include entry point related information. Also, the image/video information may include various pieces of information based on the embodiments of the present disclosure. For example, the image/video information may include the information disclosed in at least one of Table 1, 4, 6, 8, and/or 10.

The decoding apparatus derives at least one entry point within a current picture based on the image/video information S1110. For example, the decoding apparatus may derive whether WPP or tile technology is applied to the current picture based on the entry point related information included in the image/video information. When WPP is applied to the current picture, the decoding apparatus may derive at least one entry point corresponding to at least one CTU row constituting the current picture. When tile technology is applied to the current picture, the decoding apparatus may derive at least one entry point corresponding to at least one tile constituting the current picture.

The decoding apparatus performs decoding of the current slice/picture based on the at least one entry point S1120. The decoding apparatus may decode the slice/picture based on the at least one entry point. The decoding apparatus may decode the slice/picture in tile units and/or CTU row units based on the at least one entry point. To this end, the intra, inter prediction method and residual processing method described above may be applied.

Here, the entry point related information may include various pieces of information based on one embodiment of the present disclosure.

For example, the entry point related information may include offset length information and entry point offset information. For example, the offset length information may be related to the number of bits of the entry point offset information. In other words, the offset length information may indicate/represent the number of bits of the entry point offset information.

For example, the offset length information may be expressed in the form of the offset_len_minus1 syntax element. For example, the value+1 of the offset_len_minus1 syntax element may specify the number of bits of the entry point offset information (e.g., entry_point_offset_minus1 syntax element).

Also, the entry point offset information may represent the offset between two entry points. For example, in this case, the entry point offset information may express the offset between the two entry points in byte units. For example, the entry point offset information may be expressed in the form of the entry_point_offset_minus1 syntax element. For example, the value+1 of the entry_point_offset_minus1 syntax element may indicate to specify the offset in byte units.

Also, the entry point related information may include the entry point offset present flag. For example, the entry point offset present flag may be related to whether entry point offsets are signaled. In other words, the entry point offset present flag may indicate/represent whether to signal entry point offsets. For example, the entry point offset present flag may be expressed in the form of entry_point_offsets_present_flag syntax element.

When the value of the entry point offset present flag is 1, the number of entry points within a current slice may be derived. When the number of entry points derived is greater than 0, the offset length information and the entry point offset information may be configured/included in the slice header for the current slice.

The entry point offset present flag may be included in the SPS.

The entry point related information may further include an entropy coding synchronization enabled flag, and the entropy coding synchronization enabled flag may be included in the SPS.

The entry point related information may further include an entropy coding synchronization enabled flag, and the entropy coding synchronization enabled flag may be included in the SPS.

The entry point related information may include a first no-picture partition flag and a second no-picture partition flag. The first no-picture partition flag may be included in the SPS, and the second no-picture partition flag may be included in the PPS.

At this time, the value of the second no-picture partition flag included in the PPS may be configured to be the same as the value of the first no-picture partition flag included in the SPS reference by the PPS.

Based on one embodiment of the present disclosure, the entry point related information may include a no-picture partition flag. The no-picture partition flag may be related to whether no-picture partitioning is applied to a current picture. In other words, the no-picture partition flag may indicate/represent whether no-picture partitioning is applied to the current picture.

At this time, the no-picture partition flag may be signaled by being included in a PPS. For example, when a CVS or a CLVS is started, a PPS is checked, and the no-picture partition flag present within the PPS may be checked. For example, in this case, the no-picture partition flag may be expressed in the form of pps_no_pic_partition_flag syntax element.

Based on one embodiment of the present disclosure, the entry point related information may include a no-picture partition flag related to whether no-picture partitioning is applied to the current picture. The no-picture partition flag may be included in the PPS.

The entry point offset present flag may be signaled by being included in the PPS when the value of the no-picture partition flag is 0. On the other hand, when the value of the no-picture partition flag is 1, the entry point offset present flag may not be present.

For example, when the entry point offset present flag is not present, and the value of the entropy coding synchronization enabled flag is 1, the value of the entry point offset present flag may be derived as 1.

For example, when the entry point offset present flag is not present, and the value of the entropy coding synchronization enabled flag is not 1, the value of the entry point offset present flag may be derived as 0.

Meanwhile, based on one embodiment of the present disclosure, the entry point offset present flag may be included in the PPS, and values of the entry point offset present flags for all PPSs referenced by the pictures within a coded layer video sequence (CLVS) may be the same.

Although methods have been described on the basis of a flowchart in which steps or blocks are listed in sequence in the above-described embodiments, the steps of the embodiments are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the embodiments of the present document.

The aforementioned method according to the embodiments of the present document may be in the form of software, and the encoding apparatus and/or decoding apparatus according to the present document may be included in a device for performing image processing, for example, a TV, a computer, a smart phone, a set-top box, a display device, or the like.

When the embodiments are implemented in software in the present document, the aforementioned method may be implemented using a module (procedure, function, etc.) which performs the aforementioned function. The module may be stored in a memory and executed by a processor. The memory may be disposed to the processor internally or externally and connected to the processor using various well-known means. The processor may include application-specific integrated circuit (ASIC), other chipsets, logic circuits, and/or data processors. The memory may include a read-only memory (ROM), a random access memory (RAM), a flash memory, a memory card, storage media and/or other storage devices. That is, the embodiments described herein may be implemented and performed on a processor, a microprocessor, a controller, or a chip. For example, the functional units shown in each drawing may be implemented and performed on a computer, a processor, a microprocessor, a controller, or a chip. In this case, information for implementation (e.g., information on instructions) or an algorithm may be stored in a digital storage medium.

Further, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (e.g., a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

Further, the processing method to which the embodiment(s) of the present document is applied may be produced in the form of a program being executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (e.g., transmission over the Internet). Further, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer by the embodiment(s) of the present document. The program code may be stored on a computer-readable carrier.

Figure 13:
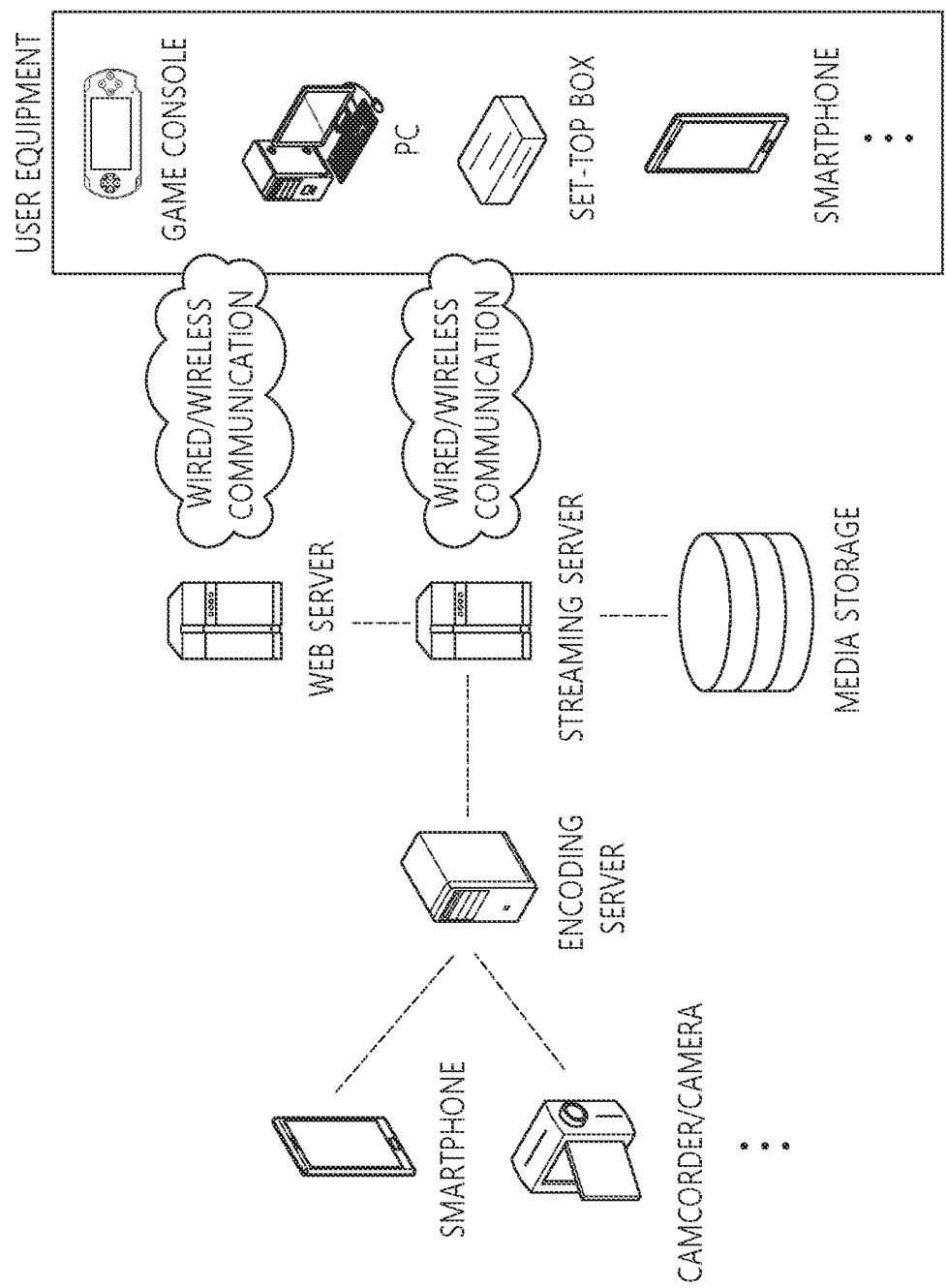
FIG. 13 illustrates an example of a contents streaming system to which embodiments of the present disclosure may be applied.

FIG. 13 represents an example of a content streaming system to which the embodiments described in the present document may be applied.

Referring to FIG. 13, the content streaming system to which the embodiments of the present document are applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document are applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the content streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the content streaming system may be operated as a distributed server, and in this case, data received by each server may be processed in distributed manner.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding device, the method comprising:
   obtaining image information through a bitstream, wherein the image information includes entry point related information;
   deriving at least one entry point in a current picture based on the entry point related information; and
   decoding the current picture based on the at least one entry point,
   wherein the entry point related information includes offset length information and entry point offset information, the offset length information is related to a number of bits of the entry point offset information,
   wherein the at least one entry point is derived based on the offset length information and the entry point offset information,
   wherein the entry point related information includes an entry point offset present flag related to whether entry point offsets are signaled, wherein based on a case where a value of the entry point offset present flag is 1, a number of entry points in a current slice is derived, wherein based on a case where the number of entry points is greater than 0, the offset length information and the entry point offset information are included in a slice header for the current slice, wherein the entry point offset present flag is included in a sequence parameter set (SPS), wherein the entry point related information includes a first no-picture partition flag and a second no-picture partition flag, and the first no-picture partition flag is included in the SPS, and the second no-picture partition flag is included in a picture parameter set (PPS), and wherein a value of the second no-picture partition flag included in the PPS is configured to be the same as a value of the first no-picture partition flag included in the SPS referenced by the PPS.

2. The method of claim 1, wherein the entry point related information includes an entropy coding synchronization enabled flag, and wherein the entropy coding synchronization enabled flag is included in the SPS.

3. An image encoding method performed by an encoding device, the method comprising:

deriving at least one entry point in a current picture;

generating entry point related information based on the at least one entry point; and encoding image information including the entry point related information, wherein the entry point related information includes offset length information and entry point offset information, the offset length information is related to a number of bits of the entry point offset information, wherein the entry point related information includes an entry point offset present flag related to whether entry point offsets are signaled, wherein based on a case where a value of the entry point offset present flag is 1, a number of entry points in a current slice is derived, wherein based on a case where the number of entry points is greater than 0, the offset length information and the entry point offset information are included in a slice header for the current slice, wherein the entry point offset present flag is included in a sequence parameter set (SPS), wherein the entry point related information includes a first no-picture partition flag and a second no-picture partition flag, and the first no-picture partition flag is included in the SPS, and the second no-picture partition flag is included in a picture parameter set (PPS), and wherein a value of the second no-picture partition flag included in the PPS is configured to be the same as a value of the first no-picture partition flag included in the SPS referenced by the PPS.

4. The method of claim 3, wherein the entry point related information includes an entropy coding synchronization enabled flag, and wherein the entropy coding synchronization enabled flag is included in the SPS.

5. A non-transitory computer-readable digital storage medium storing a bitstream generated by an image encoding method, the method comprising:

deriving at least one entry point in a current picture;

generating entry point related information based on the at least one entry point; and encoding image information including the entry point related information to generate the bitstream, wherein the entry point related information includes offset length information and entry point offset information, the offset length information is related to a number of bits of the entry point offset information, wherein the entry point related information includes an entry point offset present flag related to whether entry point offsets are signaled, wherein based on a case where a value of the entry point offset present flag is 1, a number of entry points in a current slice is derived, wherein based on a case where the number of entry points is greater than 0, the offset length information and the entry point offset information are included in a slice header for the current slice, wherein the entry point offset present flag is included in a sequence parameter set (SPS), wherein the entry point related information includes a first no-picture partition flag and a second no-picture partition flag, and the first no-picture partition flag is included in the SPS, and the second no-picture partition flag is included in a picture parameter set (PPS), and wherein a value of the second no-picture partition flag included in the PPS is configured to be the same as a value of the first no-picture partition flag included in the SPS referenced by the PPS.

\* \* \* \* \*